United States Patent [19]
Evans

[11] 3,915,137
[45] Oct. 28, 1975

[54] FUEL VAPORIZER

[76] Inventor: Hugh K. Evans, 6908 Justice Drive, Raleigh, N.C. 27609

[22] Filed: Mar. 4, 1974

[21] Appl. No.: 447,845

[52] U.S. Cl.............. 123/122 F; 219/206; 219/207; 123/141
[51] Int. Cl.² ........................................ F02M 31/00
[58] Field of Search ............ 123/122 F, 122 H, 141; 219/206, 207

[56] References Cited
UNITED STATES PATENTS

| | | | |
|---|---|---|---|
| 1,791,949 | 2/1931 | Boulede........................... | 123/122 F |
| 2,139,777 | 12/1938 | Skok................................ | 123/122 F |
| 2,175,738 | 10/1939 | Betry................................ | 123/122 F |
| 3,498,279 | 3/1970 | Seeley, Jr......................... | 219/207 |

FOREIGN PATENTS OR APPLICATIONS

| | | | |
|---|---|---|---|
| 501,019 | 3/1920 | France............................... | 219/207 |
| 340,719 | 1/1931 | United Kingdom.............. | 123/122 F |

Primary Examiner—Charles J. Myhre
Assistant Examiner—R. H. Lazarus
Attorney, Agent, or Firm—Mills and Coats

[57] ABSTRACT

The present invention relates to an electric coil type fuel vaporizer for a carburetor system of an internal combustion engine. Disposed immediately below the venturi of the carburetor, the electric coil vaporizer of the present invention vaporizes the air-fuel mixture passing through the venturi of the carburetor prior to the venturi air-fuel mixture mixing with a main system of air passing outside the venturi through the air horn of the carburetor system. By vaporizing the fuel of the venturi air-fuel mixture prior to mixing with the main system of air passing outside the venturi, it follows that less energy is required to vaporize the fuel and consequently an efficient fuel vaporization system is realized.

9 Claims, 5 Drawing Figures

U.S. Patent   Oct. 28, 1975   3,915,137
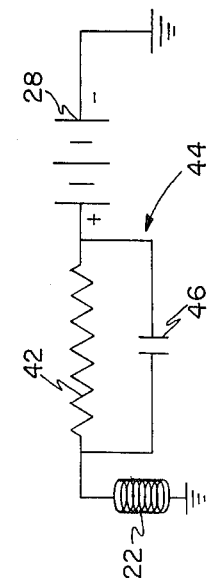
FIG. 2
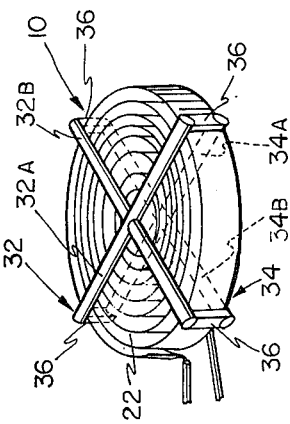
FIG. 5
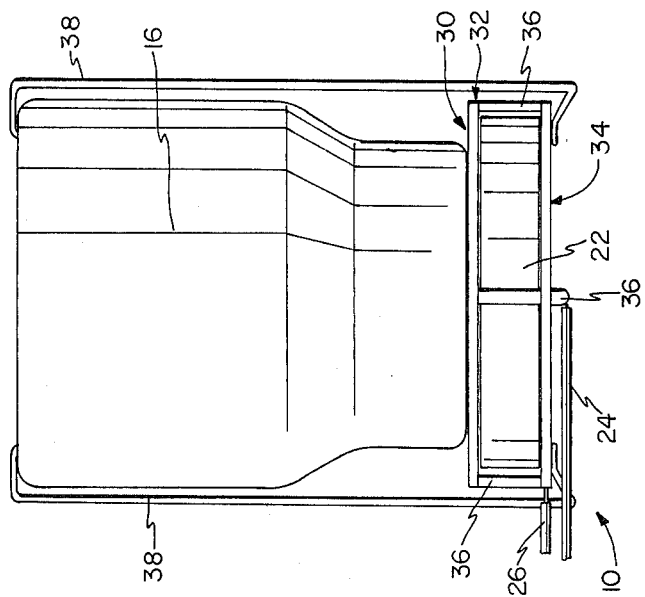
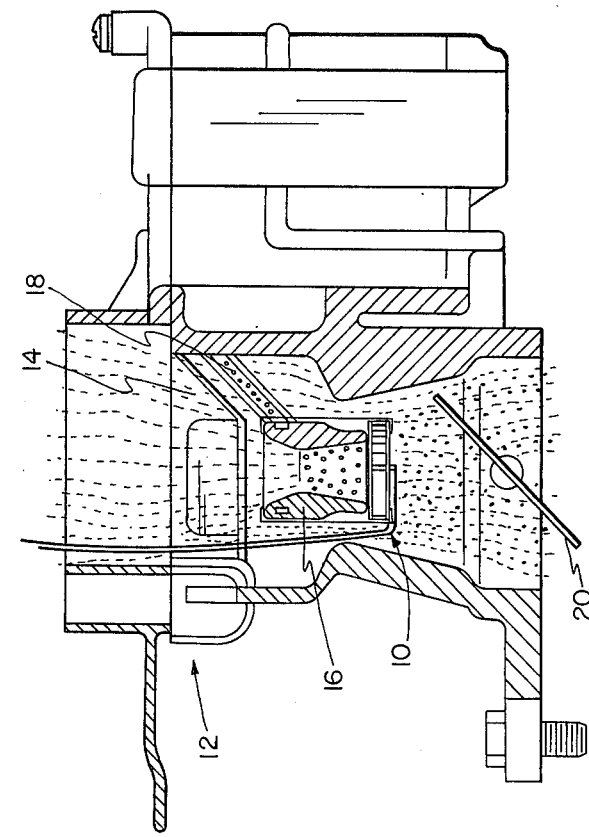
FIG. 1
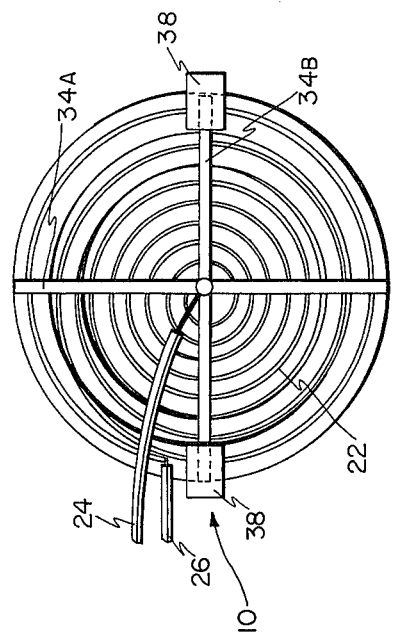
FIG. 3
FIG. 4

FUEL VAPORIZER

The present invention relates to carburetors and carburetor systems, and more particularly to a fuel vaporizer adapted to operate in conjunction with carburetors or carburetor systems.

BACKGROUND OF INVENTION

In the past, there have been fuel vaporizers for vaporizing the fuel in the final air-fuel mixture passing from the carburetor into the intake manifold of the internal combustion engine. For example, see the disclosure in the following U.S. Pat. Nos. 2,668,900; 3,492,457; 1,456,018; 3,760,780; 3,373,726; and 2,139,777. Upon a general review of these patents, it will be seen that the fuel vaporizer shown in each patent is disposed generally between the carburetor and the intake manifold of the engine and acts to vaporize the fuel of the total or final air-fuel mixture passing between the carburetor and the intake manifold. The principal disadvantage to such fuel vaporization systems is that a substantial quantity of energy is required to vaporize the fuel since it is combined with the total volume of air passing from the carburetor into the intake manifold of the engine. As a practical matter, the battery or d.c. power source of an automobile is usually insufficient to provide power to the standard energy using components of the automobile as well as supply the necessary energy to a fuel vaporizer to vaporize the fuel of the total or final air-fuel mixture passing into the intake manifold, especially when the automobile is being driven at cruising speeds in which case substantial quantities of air are being directed through the carbruetor.

Many conventional fuel vaporizers have only the capacity to give off a constant supply of energy without regard to the volume and rate of air-fuel flow passing through the carburetor and the quantity of fuel within the air flow. Thus, assuming that such fuel vaporization systems had the capacity to efficiently vaporize the fuel at high fuel and air vloumes, these fuel vaporization system could, nevertheless, be inefficient in at least a number of operating ranges. This is obvious because at different air-fuel flow rates, there is going to be different energy requirements to vaporize the fuel passing through the carburetor. Also, there is a possibility that the fuel vaproizer itself will be damaged if it is allowed to overheat as a result of there being insufficient air-fuel passing to absorb the heat being given off.

SUMMARY OF THE INVENTION

The fuel vaporizer of the present invention has been devised to efficiently vaporize the fuel within the air-fuel mixture of the carburetor system with power being only supplied to the fuel vaporizer by a conventional automobile type battery. In addition, the fuel vaporizer of the present invention also includes a control system for increasing the power supplied to the fuel vaporizer and consequently increasing the heat given off thereby, in response to increases in the flow rate of the air-fuel mixture passing through the carburetor.

More particularly, the fuel vaporizer of the present invention is of the generally circular multi-turn coil type that is adapted to fit within an insulated frame structure and to be mounted directly below the lower end of the conventional inner main venturi of the carburetor. By being disposed at the lower end of the venturi, the fuel vaporizer does not have to heat the entire air-fuel mixture passing through the carburetor as was the case in the prior art, but only acts to vaporize the limited air-fuel mixture passing through the carburetor venturi (hereafter referred to as the venturi air-fuel mixture). It is thusly seen that by vaporizing the venturi air-fuel mixture prior to the mixing thereof with the main system of air passing through the air horn of the carburetor outside of the venturi, that substantially less heat is required to vaporize the fuel at any given operating range because the majority of the air that goes to form the total or final air-fuel mixture does not have to be heated.

For controlling the power to the fuel vaporizer in accordance with the flow rate of air-fuel through the carburetor, the present invention includes an electrical circuit between the fuel vaporizer and the power source for transmitting current from the power source to the fuel vaporizer. The electrical circuit includes a preselected resistor to assure that in normal idling and low speed operations that the fuel vaproizer does not overheat and become damaged. To increase the current to the fuel vaporizer and consequently increase the heat output thereof, one suggested embodiment discloses a control circuit means placed in parallel with the resistor and is closed in response to an increase in the flow rate of air-fuel through the carburetor. The closing of the control circuit means results in increasing the current to the fuel vaporizer which results in greater quantities of heat being given off by the fuel vaporizer.

It is, therefore, an object of the present invention to provide a fuel vaporizer for increasing the volatility of the air-fuel mixture leaving a carburetor system and entering the cylinders of an internal combustion engine, thereby increasing the efficiency and performance of that engine.

A further object of the present invention resides in the provision of an efficient fuel vaporization system that vaporizes the fuel of the venturi air-fuel mixture passing from the venturi of a carburetor system prior to the mixing thereof with the main system of air passing through the air horn (outside the venturi) of the carburetor system, thereby requiring substantially less heat to vaporize the fuel than if the entire system of air were heated in the process.

Another object of the present invention is to provide an electric fuel vaporizer having control means operatively associated therewith for controlling and varying the heat given off by said fuel vaporizer in response to changes in the flow rate of the air-fuel mixture passing through the carburetor, thereby enabling the fuel vaporizer to operate efficiently at idling and at various operating speeds.

Still a further object of the present invention is to provide an open insulated frame structure for supporting the fuel vaporizer of the present invention, and means for mounting said open insulated frame structure and fuel vaporizer closely adjacent the lower end of the carburetor system venturi, whereby the venturi air-fuel mixture is vaporized before mixing with the main system of air passing through the air horn of the carburetor system.

Another object of the present invention is to provide a simple and reliable fuel vaporizer for the carburetor system of an internal combustion engine wherein the fuel vaporizer is of the electric type and can be powered by the battery of the automobile in which the present invention is used.

In addition, a further object of the present invention is to provide a fuel vaporizer for the carburetor system of an internal combustion engine which can easily and conveniently be installed in an existing carburetor system to improve starting of the engine as well as improve gas mileage and general performance over a wide range of operating speeds.

Other objects and advantages of the present invention will become apparent from a study of the following description and the accompanying drawings which are merely illustrative of the present invention.

DESCRIPTION OF THE DRAWINGS

FIG. 1 is a sectional view of a carburetor system illustrating the electric fuel vaporizer of the present invention disposed adjacent the lower end of the carburetor venturi.

FIG. 2 is an enlarged side elevational view of the fuel vaporizer mounted closely adjacent the lower end of the carburetor venturi.

FIG. 3 is a bottom plan view of the fuel vaporizer and carburetor venturi of FIG. 2.

FIG. 4 is a perspective view of the fuel vaporizer and the insulating frame structure for supporting the same, this particular view illustrating the circular coil nature of the fuel vaporizer of the present invention.

FIG. 5 is an electrical schematic illustration of the heating coil fuel vaporizer and the electric circuit associated therewith for controlling and transmitting current from a battery source to the coil.

DESCRIPTION OF THE PREFERRED EMBODIMENT

With further reference to the drawings, particularly FIG. 1, the fuel vaporizer of the present invention is indicated generally by the numeral 10 and is mounted within a carburetor indicated generally at 12. Since the fuel vaporizer of the present invention is principally designed to operate and function within a carburetor system of the type used by internal combustion engines, attention will first be directed to the carburetor 12 and the basic component thereof as they relate to the fuel vaporizer of the present invention.

In this regard, the carburetor 12 includes a generally vertically oriented air horn which basically functions to channel or direct air through the carburetor into the intake manifold of an associated internal combustion engine, not shown. Disposed within the air horn 14 is an inner main venturi 16 that is operative to receive fuel from the fuel bowl, not shown, of the carburetor via a gas inlet line 18. Spaced below the venturi 16 is a control throttle valve 20 that is adapted to regulate the flow of the air-fuel mixture from the lower portion of the air horn 14 into the intake manifold of the engine. These carburetor components, i.e., the air horn, venturi and throttle valve, are all basic to carburetors and principals of carburetor operation. Thus, a detail discussion of these components and other conventional structure and components of the carburetor is not deemed necessary in this case since such is well known and appreciated by those skilled in the art and further since the detail structure of the carburetor itself is not material to the present invention.

Turning to a discussion of the fuel vaporizer 10, it is seen from the drawings that the same comprises a multi-turn electric heat generating coil 22 which may be a material commonly known as nichrome or any other suitable material. Because of the coil nature of the fuel vaporizer, it is seen that the same includes an inner end that terminates generally in the center of the coil and an outer end that terminates about the other periphery of the same coil. Both the outer and inner ends just referred to have wires 24 and 26 operatively connected thereto for supplying electrical current to the heating coil 22. One of the wires is preferably connected to ground while the other wire is operatively connected to an appropriate pole of a storage battery 28 (FIG. 5) of the type used in automobiles.

As illustrated in the drawings, the fuel vaporizer 10 is mounted directly below the lower end of the carburetor venturi 16. To support the electric coil fuel vaporizer 22, there is provided an open insulated frame structure 30 that is adapted to receive the heating coil 22 and to hold the same in a general horizontal position below the lower portion of the carburetor venturi 16, as best illustrated in FIG. 2. Turning to a detail discussion of the insulated frame structure 30, the same basically comprises an upper cross rod assembly 32 and a lower cross rod assembly 34. The cross rod assemblies are disposed adjacent respective top and bottom sides of the heating coil 22 and generally function to sandwich the same therebetween. The upper cross rod assembly 32 includes a pair of rods 32a and 32b, the two rods intersecting generally about the mid-point of each and disposed at right angles to each other to form a "cross" or "plus" shape. Likewise, the lower rod assembly 34 includes a pair of rods 34a and 34b that assume the same shape as the rods comprising the upper rod assembly 32.

To hold the upper and lower cross rod assemblies in vertical spaced apart relationship, a plurality of vertical posts 36 are connected between the outer ends of corresponding rods of the upper and lower cross rod assemblies 32 and 34, as illustrated in FIG. 4.

Therefore, it is seen that the electric fuel vaporizing coil 22 can be sandwiched between the upper and lower cross rod assemblies 32 and 34 and supported thereby in a position immediately below the lower end of a carburetor venturi 16. It is important that the heating coil 22 be insulated and this is accomplished by coating the rod structure (which may in fact be a wire type structure or any other suitable type structure) with a ceramic type of insulating material.

To mount the electric fuel vaporizer coil 22 and the open insulated frame structure 30 below the lower end of the carburetor venturi 16, means are provided for connecting the insulated frame structure with the venturi 16. Although springs and other suitable type connecting means may be used, the disclosure herein shows the use of a plurality of spring steel clips indicated by the numeral 38 to support the coil 22 and frame structure 30 adjacent the lower end of the venturi 16.

Turning to FIG. 5 and the schematic illustration therein showing the electrical circuit for transmitting current from a battery 28 of the d.c. type to the coil 22, it is seen that a resistor 42 is operatively connected between the battery 18 and coil 22. Resistor 44 is of preselected resistance to control the flow of current into the coil while the engine is idling or operating at slow speeds. This assures that the coil will not overheat and damage itself.

To efficiently vaporize the fuel as the speed (r.p.m.) of the engine increases and the quantity of air being routed through the carburetor increases, it is necessary to increase the current flowing to the coil 22, which obviously increases the heat generated by the same coil. To accomplish this, the present invention discloses a control circuit, indicated generally by 44 in FIG. 5, which is disposed in parallel relationship with the resistor 42. In the embodiment illustrated in FIG. 5, a reverse vacuum controlled switch 46 is interposed within the control circuit 44 and is normally open but is operative to close when the engine vacuum decreases below a predetermined value. Since engine vacuum decreases as the engine operates from idling to the higher speeds, it follows that the closing of the vacuum switch 46 results in the resistor 42 being by-passed and greater current being delivered to the heating coil 22. The greater current results in a greater quantity of heat being generated by the coil 22 for the increased flow rate of air-fuel passing the coil.

Although the reverse vacuum controlled switch is shown in FIG. 5 as one means for controlling the current in the electrical circuit, it should be appreciated that other types of controls could be used. For example, the control could be of the type adapted to sense the speed of the automobile or the engine r.p.m. and in turn allow for current by-pass of the resistor 42. One other possible system of control would provide a mechanical linkage operatively connected between the accelerator pedal of the automobile and a switch located in the control circuit 44 for by-passing the resistor 42. In such case, the mechanical linkage would be designed to close the switch in response to the accelerator being depressed a predetermined amount.

In operation, it is seen that the fuel vaporizer 10 of the present invention lies in the path of the air-fuel mixture passing through the venturi 16, this limited air-fuel mixture being referred to herein as the venturi air-fuel mixture. As this limited quantity of air moves downwardly through the venturi of the carburetor, a main system of air is passing through the air horn 14 of the carburetor, this main system of air passing outside the carburetor venturi 16. Consequently, it is seen that the fuel vaporizer 10 is generally only passed over by the venturi air-fuel mixture and not the entire system of air passing through the carburetor. As a result of this particular relationship, the fuel vaporizer 10 only has to heat the mixture associated with the venturi air-fuel mixture and to vaporize the fuel therein. This substantially reduces the total power required to vaporize the fuel.

Finally, the present invention, as explained above, provides control means for increasing the current to the fuel vaporizer coil 22 and thereby increasing the heat generating capacity thereof in response to increases in air-fuel flow rates through the carburetor 12 and particularly the venturi 16. This enables the fuel vaporizer 10 to operate efficiently at various speeds and various air flow rates as well as when the engine is idling.

From the above, it is seen that the present invention presents a fuel vaporizer that is relatively simple in construction but yet efficient in operation at various engine speeds. In addition, the fuel vaporizer by increasing the volatity of the fuel being introduced through the venturi of the carburetor increased the efficiency and performance of the engine prevents flooding, facilitates to engine starting, and especially increases the gas mileage of the engine having the fuel vaporization carburetor system of the present invention installed thereon. The increase in gas mileage is of particular importance today in view of the energy crisis and the general shortage of gasoline. This invention takes a very significant step in the conservation of gasoline, especially as it relates to automobiles and internal combustion power engines.

The terms "upper", "lower", and "forward", "rearward", etc. have been used herein merely for the convenience of the foregoing specification and in the appended claims to describe the fuel vaporizer and its parts as oriented in the drawings. It is to be understood, however, that these terms are in no way limiting to the invention since the fuel vaporizer may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a carburetor system for an internal combustion engine of the type including a carburetor having an air horn for channeling a main system of air through the carburetor; a venturi disposed within said air horn for receiving a limited system of air and mixing fuel therewith to form a venturi air-fuel mixture which upon passing through said venturi mixes with said main system of air passing through the air horn of the carburetor to form the final air-fuel mixture passing from the carburetor system; an electric fuel vaporizer assembly means disposed across the path of the venturi air-fuel mixture flow for vaporizing substantially only the venturi air-fuel mixture prior to the mixing thereof with said main system of air to form the final air-fuel mixture, said electric fuel vaporizer assembly comprising: electric heating means associated with said venturi and disposed across the path of the venturi air-fuel mixture flow for heating and vaporizing the venturi air-fuel mixture prior to mixing with said main system of air; means for mounting said heating and vaporizing means about said venturi directly in the path of the venturi air-fuel mixture; and electric circuit means for supplying electric power from an electric power source to said heating and vaporizing means for effectively vaporizing the venturi air-fuel mixture prior to mixing thereof with said main system of air.

2. The electric fuel vaporizer assembly of claim 1 wherein said heating and vaporizing means comprises a generally circular multi-turn heating coil having a center that normally aligns with the major axis of said venturi such that said heating coil generally gives off a uniform distribution of heat to the entire venturi air-fuel mixture passing through the venturi.

3. The electric fuel vaporizer of claim 2 wherein said mounting means for mounting said heating and vaporizing means about said venturi comprise an insulated frame structure means for receiving said heating and vaporizing means, and means for mounting said frame structure means directedly below said venturi.

4. The electric fuel vaporizer of claim 3 wherein said insulated frame structure means for receiving said heating and vaporizing means comprises a pair of spaced apart cross rod assemblies for receiving and sandwiching said heating and vaporizing means therebetween, and means for interconnecting said cross rod assemblies for holding the same in spaced apart relationship and retaining said heating and vaporizing means therebetween.

5. The electric fuel vaporizer of claim 4 wherein said cross rod assemblies and said means interconnecting such comprise an inner wire structure having a ceramic type coating formed thereon thereby giving rise to the insulated frame structure for receiving the heating and vaporizing means.

6. The electric fuel vaporizer of claim 5 wherein said electric circuit means includes control means for increasing the heat produced by said heating and vaporizing means in response to an increase in the air flow through said carburetor dictated by the engine associated with the carburetor system.

7. The electric fuel vaporizer of claim 6 wherein said control means includes: resistor means operatively connected in said electric circuit means; and a reverse vacuum switch circuit means connected in parallel with said resistor means for sensing changes in engine vacuum and for closing said vacuum switch circuit means and bypassing said resistor means as engine vacuum decreases beyond a predetermined value, thereby increasing the current flow through said electric circuit means and increasing the quantity of heat given off by said heating and vaporizing means.

8. A fuel vaporizing carburetor system for an internal combustion engine comprising:
   a. an air horn means for receiving a main system of air and channeling the main system of air through said carburetor;
   b. a venturi disposed within said air horn means for receiving a limited system of air and mixing fuel therewith to form a venturi air-fuel mixture which upon passing through said venturi mixes with said main system of air passing through said air horn to form a final air-fuel mixture;
   c. an insulated frame structure disposed immediately below said venturi;
   d. mounting means interconnecting said insulated frame structure with said venturi for securing said insulated frame structure closely adjacent the lower portion of said venturi;
   e. electric heating and vaporizing means held by said insulated frame structure for heating and vaporizing the venturi air-fuel mixture prior to the same mixing with said main system of air to form the final air-fuel mixture;
   f. electric circuit means for supplying electric power from an electric power source to said heating and vaporizing means for effectuating vaporization of the venturi air-fuel mixture prior to mixing with said main system of air; and
   g. control means operatively associated with said electric circuit means for increasing the heat produced by said heating and vaporizing means in response to an increase in the air flow through said carburetor dictated by the engine associated with the carburetor system.

9. The electric fuel vaporizer of claim 8 wherein said heating and vaporizing means includes an electric multi-turn circular coil held by said insulated frame structure; and wherein said insulated frame structure comprises an open type frame having a pair of spaced apart upper and lower cross rod assemblies held in spaces part relationship by a plurality of vertical post connected and extending between said cross rod assemblies, each cross rod assembly including two rods intersecting generally about the mid-point of each at general right angle to each other, the two rods of each cross rod assembly lying in substantially the same vertical plane as corresponding rods of the other rod assembly.

* * * * *